United States Patent
Lee et al.

(10) Patent No.: US 7,567,335 B2
(45) Date of Patent: Jul. 28, 2009

(54) METHOD FOR FABRICATING LIQUID CRYSTAL DISPLAY DEVICE

(75) Inventors: Yun Bok Lee, Seoul (KR); Woo Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 139 days.

(21) Appl. No.: 11/652,688

(22) Filed: Jan. 12, 2007

(65) Prior Publication Data

US 2007/0109487 A1 May 17, 2007

Related U.S. Application Data

(62) Division of application No. 10/873,140, filed on Jun. 23, 2004, now Pat. No. 7,180,568.

(30) Foreign Application Priority Data

Jun. 28, 2003 (KR) .......................... 10-2003-42965

(51) Int. Cl.
G02F 1/13 (2006.01)

(52) U.S. Cl. .................. 349/187; 349/123; 349/124; 349/125; 349/126; 349/127; 349/128; 349/129; 349/130

(58) Field of Classification Search .............. 349/187, 349/123–130

See application file for complete search history.

(56) References Cited

U.S. PATENT DOCUMENTS

| | | | | |
|---|---|---|---|---|
| 6,239,855 | B1 * | 5/2001 | Nakahara et al. | 349/153 |
| 6,373,548 | B1 * | 4/2002 | Kim | 349/158 |
| 6,642,982 | B2 * | 11/2003 | Chung et al. | 349/123 |
| 6,886,897 | B2 * | 5/2005 | Park | 347/8 |
| 6,888,608 | B2 * | 5/2005 | Miyazaki et al. | 349/156 |
| 7,033,434 | B2 * | 4/2006 | Kim | 117/4 |
| 2003/0117573 | A1 * | 6/2003 | Yi et al. | 349/158 |
| 2004/0165127 | A1 * | 8/2004 | Lin et al. | 349/110 |
| 2004/0263705 | A1 * | 12/2004 | Seo et al. | 349/43 |

FOREIGN PATENT DOCUMENTS

KR 2001-0043102 11/1999

\* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A method for fabricating a liquid crystal display device includes: forming alignment keys by at least one of ink jet printing, offset printing, screen printing and laser marking on a dummy region of an upper substrate; forming a first alignment film over an active region of the upper substrate; forming sealant along a periphery of the active region of the upper substrate; and bonding the upper substrate to a lower substrate.

1 Claim, 6 Drawing Sheets

METHOD FOR FABRICATING LIQUID CRYSTAL DISPLAY DEVICE

This application is a divisional of prior U.S. application Ser. No. 10/873,140, filed Jun. 23, 2004 now U.S. Pat. No. 7,180,568.

This application claims the benefit of the Korean Application No. P2003-0042965 filed on Jun. 28, 2003, which is hereby incorporated by reference.

BACKGROUND OF THE INVENTION

1. Field of the Invention

The present invention relates to liquid crystal display devices, and more particularly, to a method for fabricating a liquid crystal display device using alignment keys.

2. Background of the Related Art

Keeping pace with the development of an information oriented society, demand for display devices in various forms have increased. To meet these demands, various types of flat display devices, such as an LCD (Liquid Crystal Display), PDP (Plasma Display Panel), ELD (Electro Luminescent Display) and VFD (Vacuum Fluorescent Display) devices, have been used as display devices in various apparatuses. Of the various types of display devices, the LCD is most widely used for mobile display devices due do its advantages of good picture quality, light weight, thin profile, and low power consumption. Besides mobile display devices, such as displays for notebook computers, the LCD has been used in televisions and as monitors for computers. Using the LCD in various fields as a general display device increase the need of a high quality picture, such as high definition, high luminance, and a large size picture, while maintaining the features of light weight, thin profile, and low power consumption. However, recent technical developments in LCD devices to serve as general display devices by enhancing the picture quality are contradictory to above advantages in many aspects.

FIG. 1 illustrates a disassembled perspective view of a part of a related art TN liquid crystal display device, including a lower substrate 1, and an upper substrate 2 bonded together with a space therebetween, a liquid crystal layer 3 between the lower substrate 1 and the upper substrate 2. The lower substrate 1 has a plurality of gate lines 4 arranged at regular intervals in one direction, and a plurality of data lines 5 arranged at regular intervals perpendicular to the gate lines 4, to define a plurality of pixel regions "P." The upper substrate 2 has a black matrix layer 7 for shielding light to parts except the pixel regions 'P', RGB color filter layers 8 for displaying colors and a common electrode 9. The upper and lower substrates are bonded by a sealant. A space is maintained between the upper and lower substrates through the use of spacers.

A pixel electrode 6 and a thin film transistor "T" are located in each of the pixel regions. The thin film transistor "T" has a gate electrode projecting from the gate line 4, a gate insulating film (not shown) formed over an entire surface of the lower substrate 1, an active layer over the gate insulating film over the gate electrode, and a source electrode projected from the data line 5, and a drain electrode opposite to the source electrode. The pixel electrode 6 is formed of a transparent conductive metal having relatively high light transmitivity, such as indium-tin-oxide (ITO).

The twisted nematic (TN) type LCD can display a picture by orienting the liquid crystal layer 3 on the pixel electrode 6 using a signal applied through the thin film transistor "T" to manipulate the orientation of the liquid crystal layer 3 so as to control the quantity of light transmitting through the liquid crystal layer 3. The TN type LCD, which is driven by an electric field having an up/down direction, has the good characteristics of high light transmitivity and good aperture ratio. Further, a TN type LCD is resistant to static electricity because the common electrode 9 of the upper substrate 2 serves as ground.

The related art LCD has alignment problems. More particularly, the color filter layer on the upper layer is liable to misalign with the pixel region on the lower substrate during the bonding of the upper and the lower substrates. Such a positional deviation between the pixel regions on the lower substrate and the color filter layer on the upper substrate becomes an even greater problem when the substrates are larger and the apertures decrease (i.e. resolution increases). To solve these problems, a color filter On TFT (COT) array or TFT array On Color filter (TOC) structure has been proposed.

FIG. 2 illustrates a sectional view of a related art LCD of a COT structure and FIG. 3 illustrates a plan view of a related art LCD of a COT structure. Referring to FIG. 2, the related art LCD of a COT structure is provided with a lower substrate 20 having an active region thereon containing pixel regions for displaying a picture. RGB color filters 21 are positioned in each of the pixel regions within the active region on the lower substrate 20. A sealant 23 is positioned on a periphery of the active region of the lower substrate 20 to prevent leakage of the liquid crystals, and bonding the upper substrate 30 and lower substrate 20.

An alignment film 22 is formed over an entire surface of the lower substrate 20 and the RGB color filter layers 21. The alignment film 22 is formed larger than the active region with a preset margin "a" , and the sealant is spaced from the alignment film 22 with a preset margin "b" for preventing the alignment film 22 from peeling. Moreover, although not shown, there are alignment keys formed on the lower substrate 20 on an outer side of the sealant 23 formed at the time of patterning the gate lines and the data lines. There is also an alignment film 32 in an active region 32 of the upper substrate 30 shown in FIGS. 2 and 3.

To prevent back light leakage from outside of the active region, the upper substrate 30 has a light shielding film 31 on a periphery of the upper substrate 30, i.e., around the active region. Alignment keys 33 are formed on the upper substrate 30 and the lower substrate 20 on an outer side of the light shielding film 31 for an accurate alignment during different processes. The regions of the substrates that the alignment keys are formed on will be cut away after the bonding of the upper/lower substrates. Alignment keys 33 are, for an example, alignment film printing keys, bonding keys, and seal printing keys, and the like.

Since no black matrix layer is formed on the active region of the upper substrate, the COT structure may have a light shielding film of resin over a channel region of a thin film transistor on the lower substrate to prevent reflection of an external light. In the process for applying the resin over the channel region of the thin film transistor on the lower substrate, a light shielding film of resin is formed on the outer side of the active region of the lower substrate instead of on the outer side of the active region of the upper substrate. Although a structure is suggested, in which a light shielding film of resin is formed on an outer periphery of the active region of the lower substrate to shield a back light leaking from an outer part of the active region, even if the light shielding film is formed on the lower substrate thus, the fabrication process is not simple because it requires the formation of alignment keys on the upper substrate by a photo-etching process. That is, even if the light shielding film is formed on the outer side of the active region of the lower substrate instead of about the periphery of the active region of the upper substrate, there is a problem in that the process for forming the alignment keys on the outer side of the active region of the upper substrate 30 uses a photo-etching process, which is complicated and requires precision.

SUMMARY OF THE INVENTION

Accordingly, the present invention is directed to a method for fabricating a liquid crystal display device that substantially obviates one or more of the problems due to limitations and disadvantages of the related art.

An object of the present invention is to provide a method for fabricating a liquid crystal display device, which can simplify a process for forming alignment keys.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the method for fabricating a liquid crystal display device includes the steps of: forming alignment keys by at least one of ink jet printing, offset printing, screen printing and laser marking on a dummy region of an upper substrate; forming a first alignment film over an active region of the upper substrate; forming sealant along a periphery of the active region of the upper substrate; and bonding the upper substrate to a lower substrate.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings.

The present invention forms alignment keys, not by the complicate photo-etching processes, but by ink jet printing, offset printing, screen printing, or laser marking, which requires no precision. The present invention in which the alignment keys are formed by one of above methods is applicable to the COT or TOC type LCD, in which a light shielding film is formed along an outer side periphery of a channel region of a thin film transistor and an active region. Unlike the complicated processes described above, the method for fabricating an LCD of the present invention does not need high position accuracy nor high precision in patterning the alignment keys. The alignment keys can be alignment film printing keys, bonding keys, and seal printing keys, and the like.

FIGS. 4A to 4D are sectional views illustrating the steps of a process for forming alignment keys on an upper substrate in an LCD device according to an exemplary embodiment of the present invention.

Figure 1:
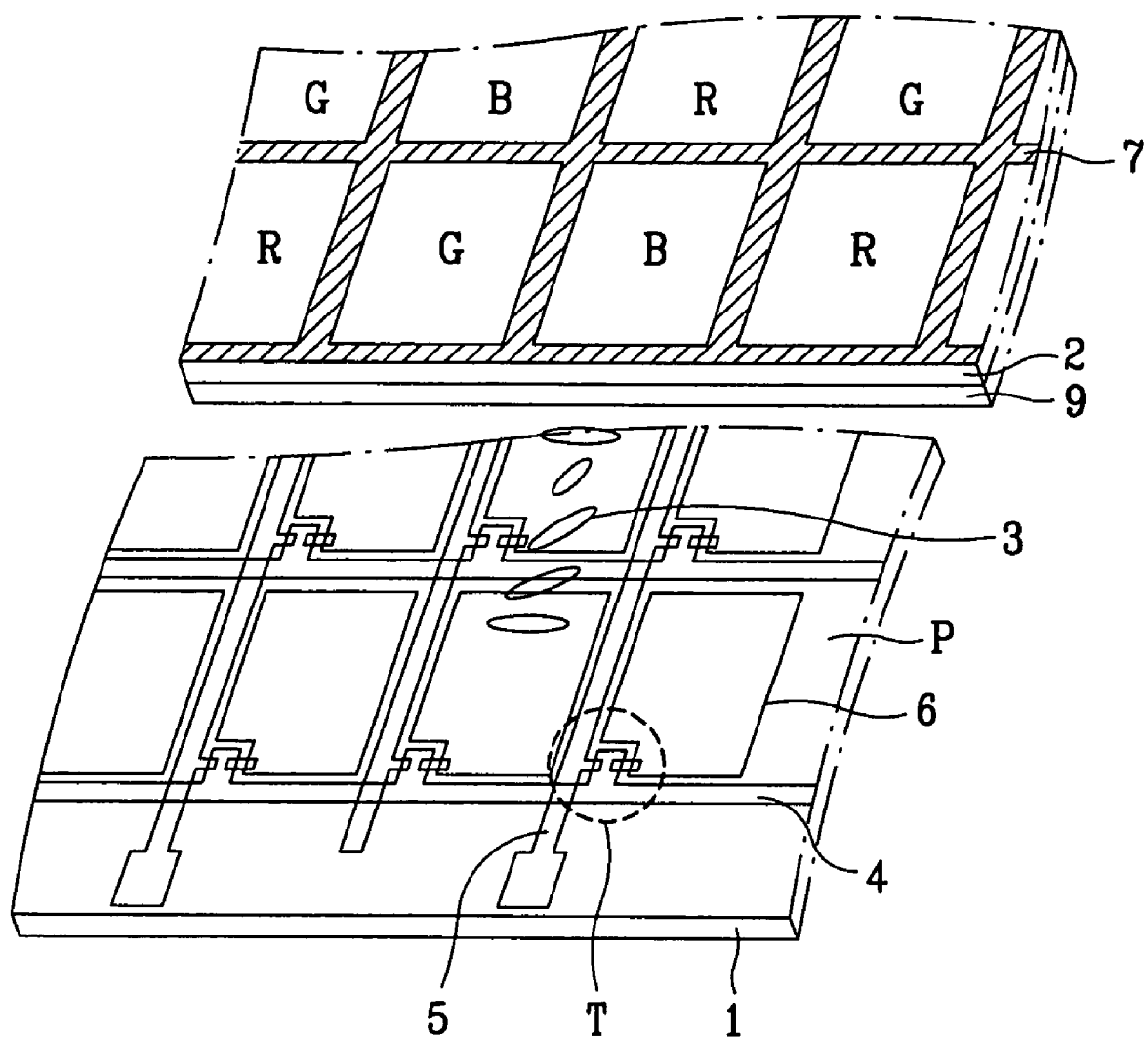
FIG. 1 illustrates a disassembled perspective view of a part of a related art TN liquid crystal display device.
Figure 2:
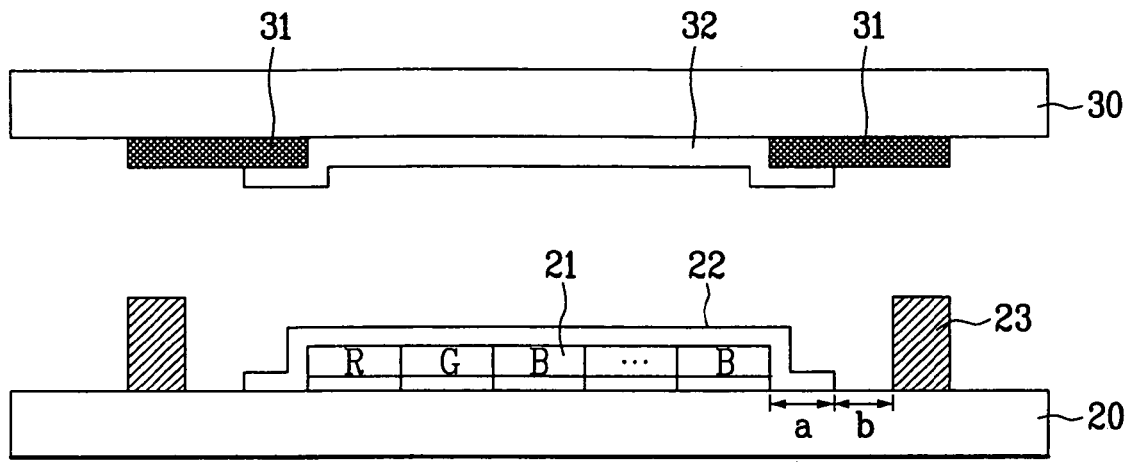
FIG. 2 illustrates a sectional view of a related art LCD of a COT structure.
Figure 3:
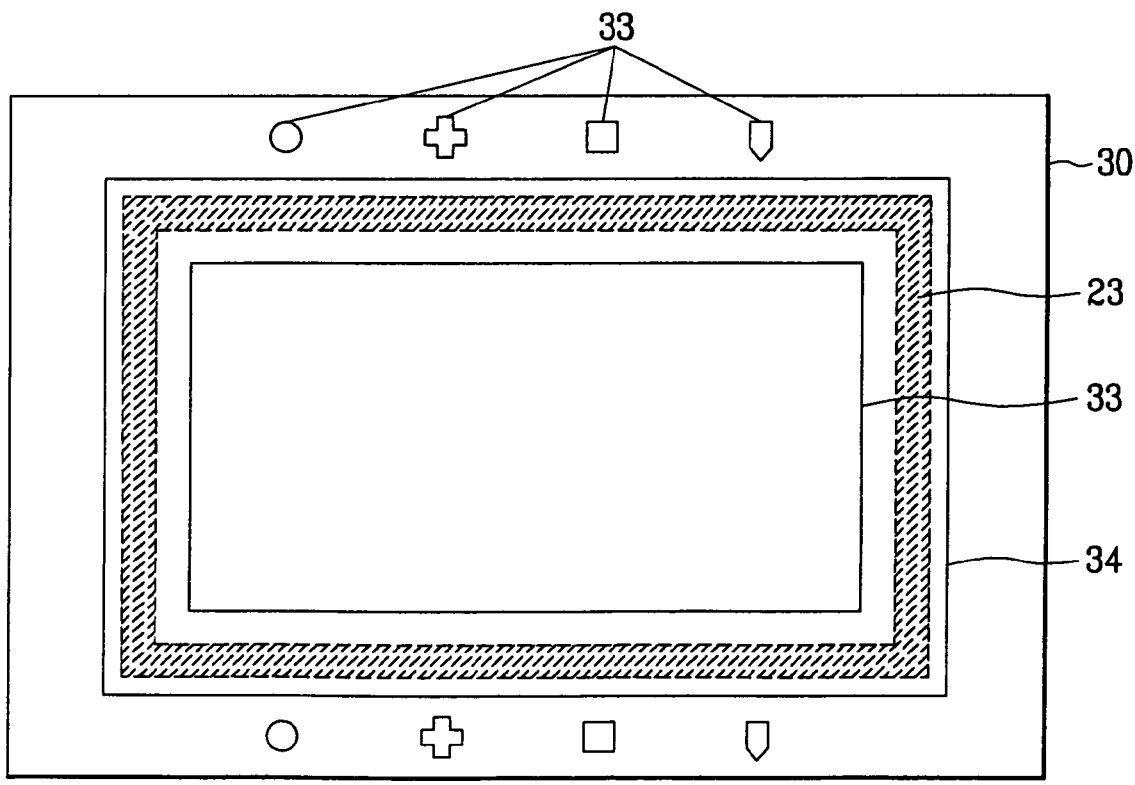
FIG. 3 illustrates a plan view of a related art LCD of a COT structure in FIG. 2.
Figure 4A:
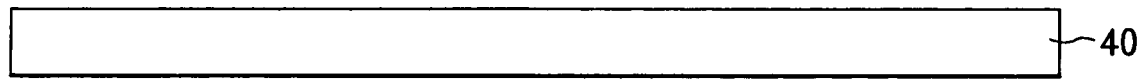
FIGS. 4A to 4D are sectional views illustrating the steps of a process for forming alignment keys on an upper substrate in an LCD device according to an exemplary embodiment of the present invention.

Referring to FIG. 4A, an upper substrate 40 having an active region and a dummy region defined thereon is provided for forming a first alignment film. The upper substrate 40 has neither a color filter layer, nor a black matrix layer, formed thereon. This is because the color filter layer is formed on each of the pixel regions of a lower substrate, and a light shielding film is formed on an outer side of the active region of the lower substrate for shielding a back light leaking from the outer side of the active region. Then, alignment keys are formed on the outer side of the active region of the upper substrate by using ink jet printing, offset printing, screen printing, or laser marking. The alignment keys formed in the dummy region 51 or 61 (see FIGS. 5 or 6) of the upper substrate will be cut away in a following scribing process.

Figure 4B:
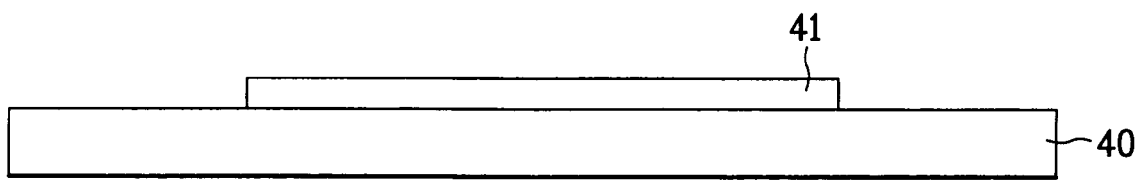

As shown in FIG. 4B, a first alignment film 41 is formed on the upper substrate 40. If neither the color filter layer nor the back matrix layer on the upper substrate 40 are formed on the upper substrate 40, no precise aligning is required in the formation of the first alignment film 41 on the upper substrate 40 because there is no pattern formed on the upper substrate 40. Thereafter, a rubbing process is carried out in which no alignment keys are required.

Figure 4C:
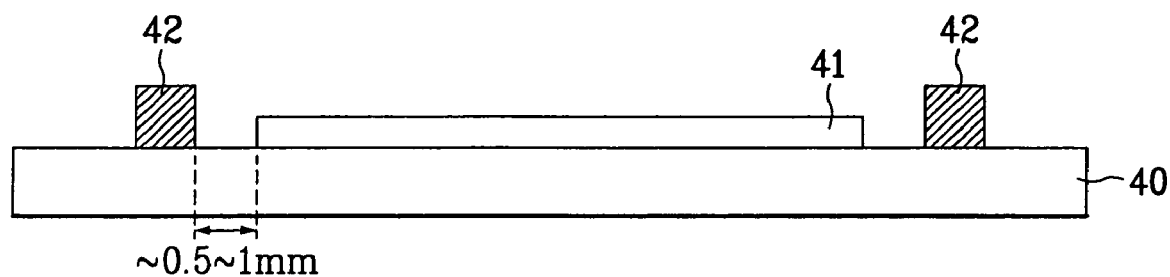

As shown in FIG. 4C, after the first alignment film 41 is formed, sealant 42 is applied on the outer side of the active region of the upper substrate 40 spaced a distance away from the first alignment film 41. In this instance, since the distance required between the first alignment film 41 and the sealant 42 is approximately 0.5~mm, high precision is not required.

Figure 4D:
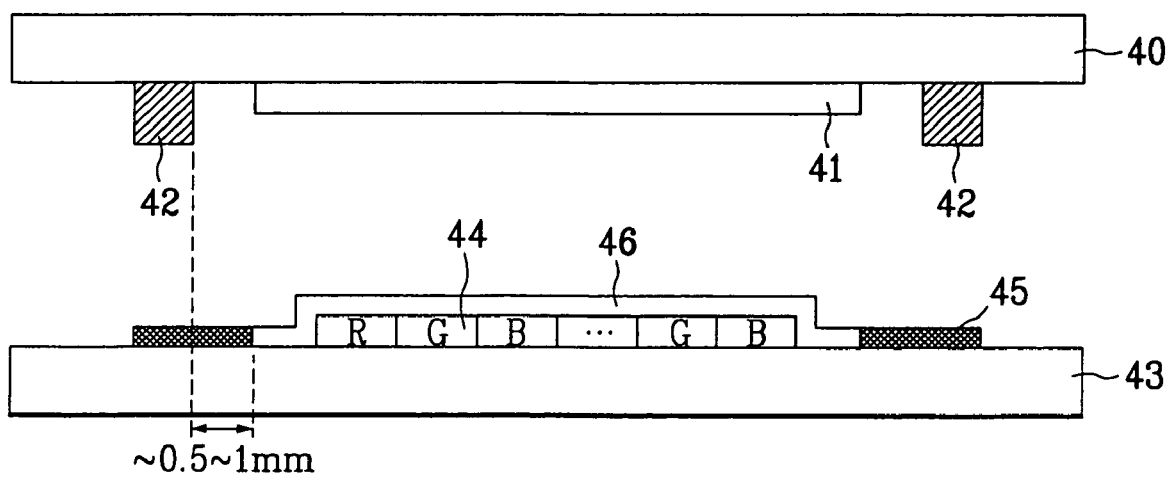

As shown in FIG. 4D, a process for bonding the upper substrate 40 and the lower substrate 43 is carried out. In this instance, the lower substrate 43 has RGB color filter layers 44 on each of the pixel regions in the active region, a light shielding film 45 on the outer periphery of the active region, and a second alignment film 46 formed on the active region inclusive including the color filter layer 44 and a region extending therefrom. In the foregoing bonding of the upper substrate 40 and lower substrate, high precision is not required because the distance between the sealant 42 on the upper substrate 40 and the second alignment film 46 on the lower substrate 43 is approximately 0.5~1 mm. Moreover, the precision required in the scribing for a plurality of cell units formed on a large substrate is at a level of ±0.5 mm, which is not high.

A relatively low precision is required in the processes of forming the first alignment film 41, positioning the sealant 42 on the upper substrate 40, and bonding of the upper and lower substrates 40 and 43. Thus, there is no need for high precision in these processes that requires high precision alignment keys, such as an alignment film printing key, a seal printing key, and a bonding key in the dummy region on an outer side of the active region of the upper substrate 40. In other words, a sub-µm alignment precision like used in the formation of the thin film transistor of the related art is not necessary for these processes. A level of 1 mm unit (1000 µm) precision is sufficient for these processes in accordance with exemplary embodiments of the invention. Accordingly, the complicate patterning technique of the photo-etching and the like in the related art are not necessary.

Figure 5:
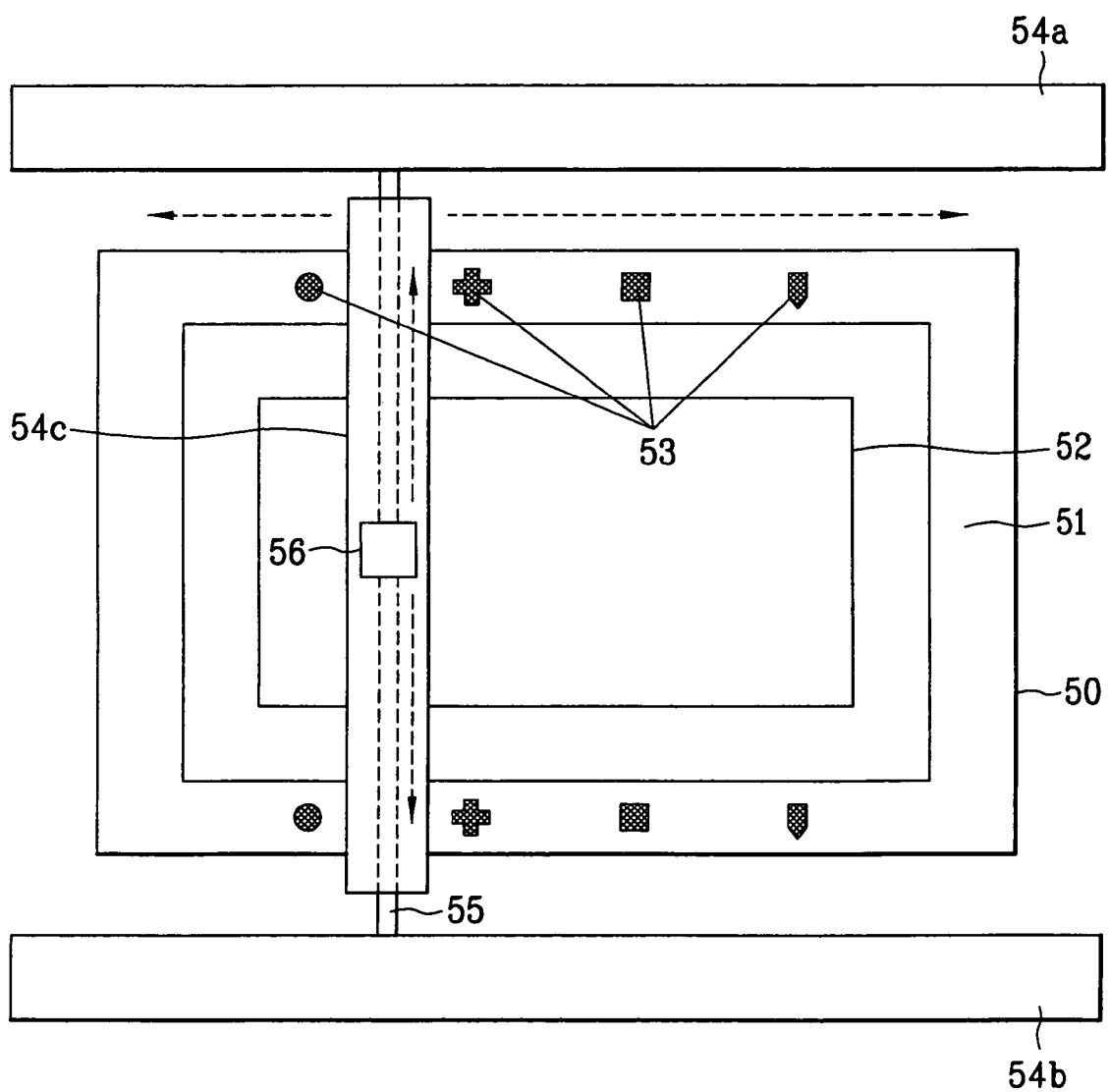
FIG. 5 illustrates a plan view for forming alignment keys in accordance with a first preferred embodiment of the present invention.
Figure 6:
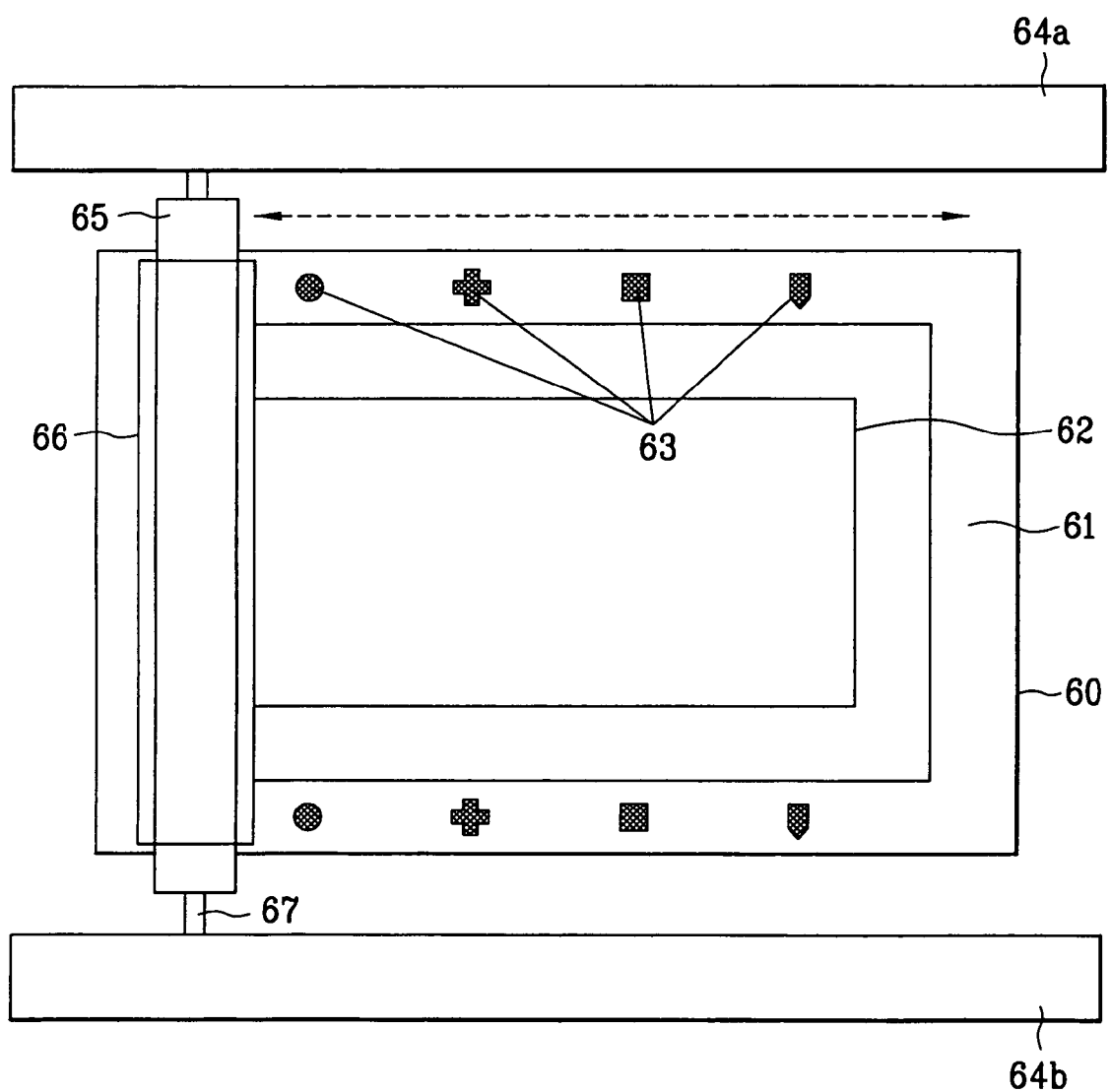
FIG. 6 illustrates a plan view for forming align keys in accordance with a second preferred embodiment of the present invention.

In exemplary embodiments of the present invention, the alignment keys are fabricated by simple processes, such as ink jet printing, offset printing, screen printing, or laser marking, using low price apparatuses. A process for forming the alignment keys using two of the above methods will be described in reference to FIG. 5 and FIG. 6. FIG. 5 illustrates a plan view for forming alignment keys in accordance with a first preferred embodiment of the present invention and FIG. 6 illustrates a plan view for forming alignment keys in accordance with a second preferred embodiment of the present invention. The alignment keys 53 in FIG. 5 and alignment keys 63 of FIG. 6 are respectively formed on a dummy region 51 of the upper substrate 50 in FIG. 5 and a dummy region 61 of the upper substrate 60 in FIG. 6.

Referring to FIG. 5, in the formation of the alignment keys by ink jet printing, ink is dropped on desired parts of the dummy region 51 of the upper substrate 50 upon reception of a signal to dispense ink using an ink jet apparatus having an ink jet head 56. The ink jet apparatus includes a vertical head driver 54*c* with a shaft 55 for moving the ink jet head 56 in up/down direction with respect to the upper substrate 50, and upper head driver 54*a* and lower head driver 54*b* for moving the ink jet head 56 and the vertical head driver 54*c* in left and right directions, to form the alignment keys 53. Instead of the above ink jet apparatus, the alignment keys can be formed by using conventional ink jet apparatuses.

In addition or in the alternative, alignment keys can be formed by offset printing. Desired patterns are engraved in a copper plate 66, as shown in FIG. 6, for printing on the dummy region 61 of the upper substrate 60. The copper plate 66 is used to print the alignment mark by using an offset printing apparatus having an ink dispensing roll 65 with a shaft 67 for moving the copper plate 66 in left and right directions, and an upper head driver 64*a* and a lower head driver 64*b* for moving the copper plate 66 and the ink dispensing roll 65 in left and right directions together with the shaft 67. Instead of the above offset printing apparatus, the alignment keys can be formed by using conventional offset printing apparatuses.

In conventional offset printing, ink is transferred from a plate surface to a rubber blanket, and therefrom to a place intended to print thereon. For example, a conventional offset printing apparatus has an assembly of three cylinders including a plate cylinder for winding a printing plate, a rubber blanket, and an impression cylinder, and has a wetting device for preventing attachment of the ink on non-scanning part. Most of the conventional offset printing apparatuses are rotary presses. Further, there are multi-color press which can print more than two colors. Furthermore, there are presses that can print on two sides of an item.

In another alternative or in addition, alignment keys can be formed on a dummy region of an upper substrate by laser marking. Although not shown in the figures, a laser beam is directed onto the dummy region of the upper substrate so as to engrave the alignment keys of intended size and pattern. In yet another alternative or in addition, alignment keys can be formed on a dummy region of an upper substrate by screen printing. Although not shown in the figures, the align keys can be formed on the dummy region of the upper substrate using conventional screen printing processes.

Conventional screen printing processes includes printing with a screening material, such as silk, nylon, tetoron fabric, stainless steel plate, or glass plate that is placed on and fastened to a frame. Squamae is then formed either manually by eye or by a photo-chemical method on the screening material. Printing is done by pouring printing ink into the frame and applying pressure to an inside surface of the screen with a tool called a squeegee. The squeegee is moved so that the ink passes through parts of the screening material without the squamae to print the ink on a material to be printed under the screening material. Screen printing enables printing not only on a flat object, but also on a side of cylinder, or conical body, direct adhesive printing. Further, screen printing can be done on a flexible material, such as paper or cloth. Furthermore, screen printing can be done on a hard plate, such as metal, or hard plastic as well as on fragile material, such as glass due to its low printing pressure. Moreover, the screen printing can print, to have a thick printed ink layer, on a unique shaped body (cup, bottle, industrial components, and the like), extra large sized poster, placard, various displaying materials, printed circuit board of electronic products, and even printing of micron precision.

As has been described, the method for fabricating a liquid crystal display device according to an exemplary embodiments of the present invention has at least the following advantages. First, the requirements for position accuracy and pattern precision are not high for forming the alignment keys on the upper substrate. Second, the alignment keys can be formed easily by using simple fabrication methods. That is, the fabrication process can be simplified because the alignment keys can be formed by a method that is less complicated and with the precision of about 1 mm.

It will be apparent to those skilled in the art that various modifications and variations can be made in the a method for fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device comprising:

forming alignment keys by at least one of ink jet printing, offset printing, screen printing and laser marking on a dummy region of an upper substrate;

forming a first alignment film over an active region of the upper substrate;

forming sealant along a periphery of the active region of the upper substrate; and bonding the upper substrate to a lower substrate, wherein forming alignment keys by offset printing includes printing desired patterns engraved in a copper plate on the dummy region on the upper substrate while moving the copper plate in left, and right directions by using an offset printing apparatus, wherein the offset printing apparatus has the copper plate with the desired patterns engraved therein, an ink dispensing roll with a shaft for moving the copper plate in left and right directions, and an upper head driver and lower head driver for moving the copper plate and the ink dispensing roll in left and right directions together with the shaft.

* * * * *